INVENTOR.
RICHARD J. PETSCHAUER
BY Braddock & Burd
ATTORNEYS

INVENTOR.
RICHARD J. PETSCHAUER
BY
Braddock & Burd
ATTORNEYS

United States Patent Office 3,348,069
Patented Oct. 17, 1967

3,348,069
REVERSIBLE SHIFT REGISTER WITH SIMULTANEOUS RECEPTION AND TRANSFER OF INFORMATION BY EACH STAGE

Richard J. Petschauer, Minneapolis, Minn., assignor to Fabri-Tek Incorporated, Hopkins, Minn., a corporation of Wisconsin Filed May 7, 1965, Ser. No. 454,132
17 Claims. (Cl. 307—88.5)

ABSTRACT OF THE DISCLOSURE

A storage register having a plurality of bistable elements interconnected so that information in the elements can be shifted right or left by signals from common bus lines; and including time delay circuitry to allow the simultaneous reception and transmission of information by each bistable circuit.

This invention is concerned with control apparatus, and more particularly with a reversible shift register for a calculating or data storage device.

Shift registers or binary counters are now well known in the art. Binary shift registers form an integral part of almost all digital computers, which computers are finding an ever increasing usefulness in contemporary civilization. Generally, a shift register comprises a plurality of interconnected bistable circuits or stages. Each stage is capable of storing an information "bit," that is, capable of giving a "true" indication or a "false" indication. In a serial type shift register, information is shifted sequentially between the stages of the shift register to transfer it to a desired position in the register, or to shift it to the proper place in the computer. Through this shifting function, a plurality of arithmetic operations may be performed, or information may be stored in or retrieved from various memory storage apparatus. There are many variables concerned in the selection of a proper shift register, including the type of bistable circuit, the frequency of operation, the power drain, the susceptibility to error, the selection of a parallel versus a serial type shift register, and numerous other specifications.

The serial shift register of this invention is unique in the construction of the bistable circuits or stages which are interconnected to form a reversible shift register, which may be shifted left or right without the use of more stages than a common serial shift register which may only shift in one direction.

Briefly described, the bistable circuit of the shift register comprises a pair of cross-couple transistors. When one of the transistors is on, the stage gives a false indication and the other transistor is off. When the other transistor turns on it turns off the false transistor and causes the stage to give a true indication. The output of each transistor is connected through an OR gate to the control electrode of one of the transistors in each of the left and right hand adjacent stages. There is also provided a source of left shift signal and a source of right shift signal. These sources are connected through further OR gates in each stage to the input of the OR gate connected to the control electrodes. Thus, when a signal is given for shifting in a particular direction, the logic formed by the OR gates will enable each stage to accept information only from the proper direction. For example, in the embodiment shown in this specification, the appearance of a left shift signal at each stage will allow that stage to accept information only from its right hand adjacent neighbor in the shift register. If the stage receiving information already is storing the same information received, there will be no change. If the stage receiving information is storing information different than that to be received, it will shift or trigger to store the received information.

Since each stage in the serial shift register shifts upon command from a single source of left or right shift signal, each stage must store new information at essentially the same time it is shifting its old information to the adjacent stage. To overcome any possibility of error due to coincident storing and shifting of information, the shift register of this invention employs time constant means in the interconnection between stages. The time constant means are selected such that each stage will be responsive only to the information that was in the adjacent stage at the time the shift signal appeared, and will not be sensitive to further changes in that information occurring during a single shift cycle.

Figure 1:
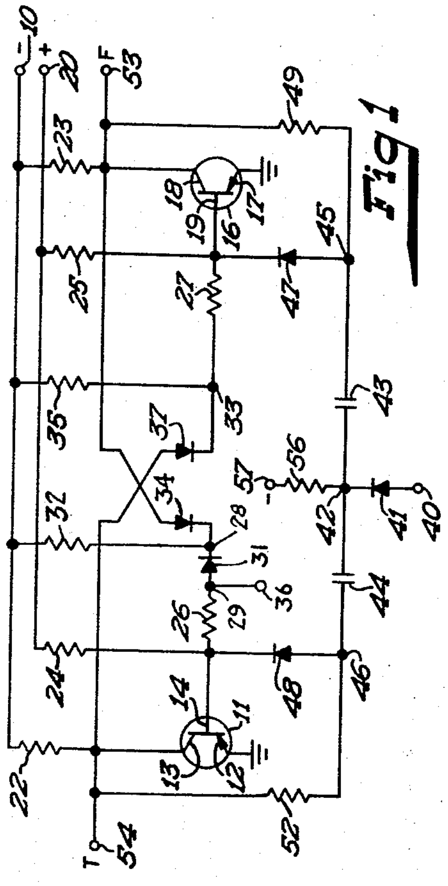
FIGURE 1 is a schematic drawing of a portion of the bistable circuit used in the shift register of this invention.

In FIGURE 1 there is disclosed a pair of transistors 11 and 16, here shown as PNP transistors. Transistor 11 has an input electrode or emitter 12, an output electrode or collector 13, and a control electrode or base 14. Transistor 16 has an input electrode or emitter 17, an output electrode or collector 18, and a control electrode or base 19. Emitters 12 and 17 are each connected to a common ground. Collector 13 is connected through a resistor 22 to a negative power input terminal 10. Collector 18 is connected through a resistor 23 to input terminal 10. Base 14 is connected through a resistor 24 to a positive power input terminal 20. Base 19 is connected through a resistor 25 to input terminal 20. Base 14 is also connected through a resistor 26 to a junction 29. Junction 29 is connected through a diode 31 to a junction 28. Junction 28 is connected through a resistor 32 to input terminal 10. Base 19 is also connected through a resistor 27 to a junction 33. Junction 33 is connected through a resistor 35 to input terminal 10. Collector 13 is connected through a diode 37 to junction 33. Collector 18 is connected through a diode 34 to junction 28. Collector 13 is also connected to a true output terminal 54, while collector 18 is connected to a false output terminal 53.

There is also shown a toggle input terminal 40, and a clear input terminal 36. Terminal 36 is connected to junction 29. Terminal 40 is connected through a diode 41 to a junction 42. Junction 42 is connected through a resistor 56 to a negative power input terminal 57. Junction 42 is also connected through a capacitor 44 to a junction 46, and through a capacitor 43 to a junction 45. Junction 46 is connected through a diode 48 to base 14 of transistor 11, and is also connected through a resistor 52 to true output terminal 54. Junction 45 is connected through a diode 47 to base 19 of transistor 16, and is also connected through a resistor 49 to false output terminal 53.

Figure 2:
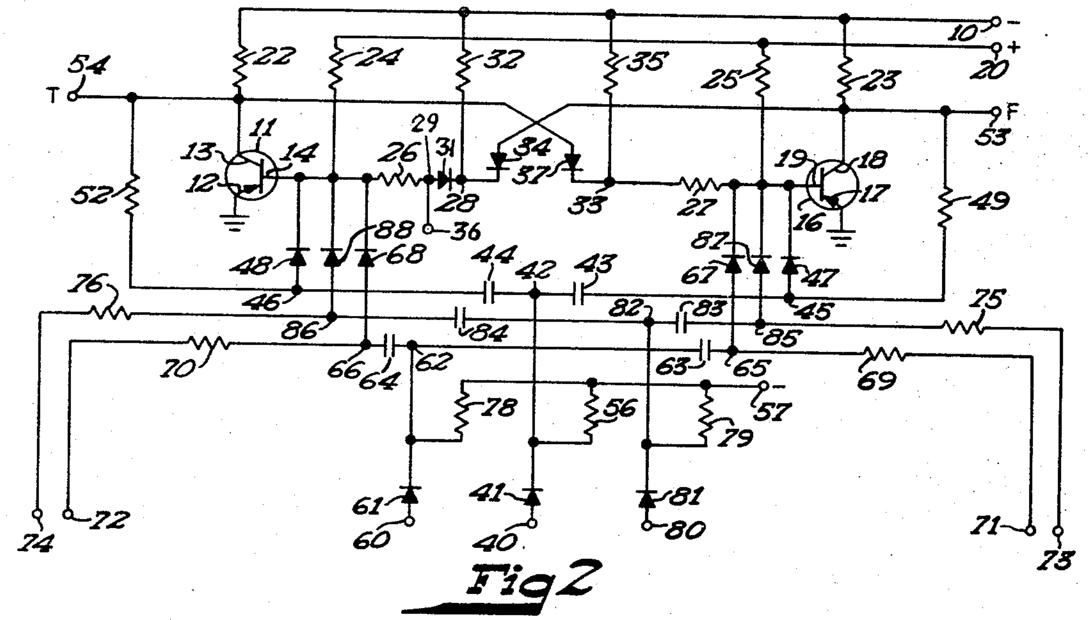
FIGURE 2 is a schematic drawing of the complete bistable circuit used in the shift register of this invention.

FIGURE 2 discloses the bistable circuit of FIGURE 1 with additional OR gates adapted to receive inputs from left and right shift signal means and with additional OR gates connected to bases 14 and 19 of transistors 11 and 16, respectively. In addition to the structure described in FIGURE 1, FIGURE 2 discloses a left shift signal input terminal 60, and a right shift signal input terminal 80. Terminal 60 is connected through a diode 61 to a junction 62. Junction 62 is connected through a resistor 78 to negative power input terminal 57. Junction 62 is also connected through a capacitor 64 to a junction 66, and through a capacitor 63 to a junction 65. Junction 66 is connected through a diode 68 to base 14 of transistor 11, and is connected through a resistor 70 to a left shift information input terminal 72. Junction 65 is connected through a diode 67 to base 19 of transistor 16, and is also connected through a resistor 69 to a left shift information input terminal 71.

Terminal 80 is connected through a diode 81 to a junction 82. Junction 82 is connected through a resistor 79 to power input terimnal 57. Junction 82 is also connected through a capacitor 84 to a junction 86, and connected through a capacitor 83 to a junction 85. Junction 86 is connected through a diode 88 to base 14, and is also connected through a resistor 76 to a right shift information input terminal 74. Junction 85 is connected through a diode 87 to base 19, and is also connected through a resistor 75 to a right shift information terminal 73. It is thus apparent that diodes 41, 61 and 81, in conjunction with resistors 56, 78 and 79, respectively, form a signal input OR gate capable of receiving left or right shift signals, as well as a toggle signal. Further, diodes 48, 68 and 88 form an OR gate capable of passing left and right shift information as well as toggle information to control electrode or base 14 of transistor 11. Also, diodes 47, 67 and 87 form an OR gate capable of passing left or right shift information as well as toggle information to control electrode or base 19 of transistor 16.

Figure 3:
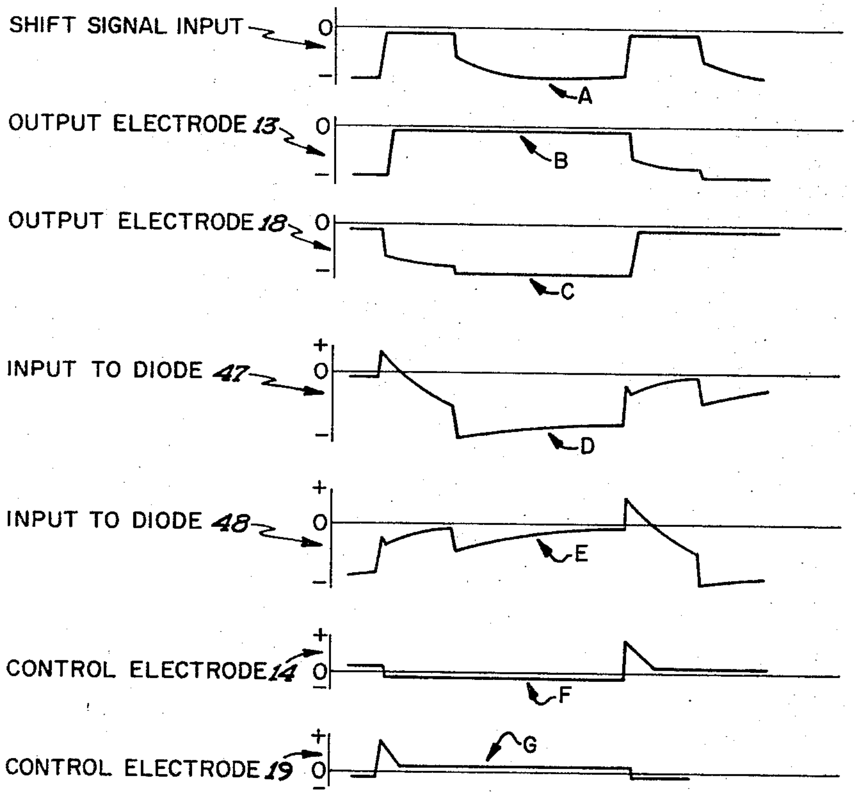
FIGURE 3 is a set of curves representing the waveforms at various points in the bistable circuit of FIGURE 2 during the shift cycle.

FIGURE 3 discloses a set of wave-forms occurring at various points in each bistable circuit of the shift register during a pair of shift cycles which shift a stage from the false to true state, and back to false again. Each waveform is laid on a graph in which the abscissa represents units of time, while the ordinate represents units of voltage. Wave-form A represents the signal input which may appear at terminals 40, 60 or 80. Wave-form B represents the voltage appearing on output electrode or collector 13 of transistor 11. Wave-form C represents the voltage on output electrode or collector 18 of transistor 16. Wave-form D represents the resulting voltage on the input to the OR gate connected to control electrode or base 19 of transistor 16. Wave-form E represents the resulting voltage on the input to the OR gate connected to control electrode or base 14 of transistor 11. Wave-forms F and G represent the resulting voltages on control electrodes 14 and 16 of transistors 11 and 16 corresponding, respectively, to OR gate input wave-forms D and E.

Figure 4:
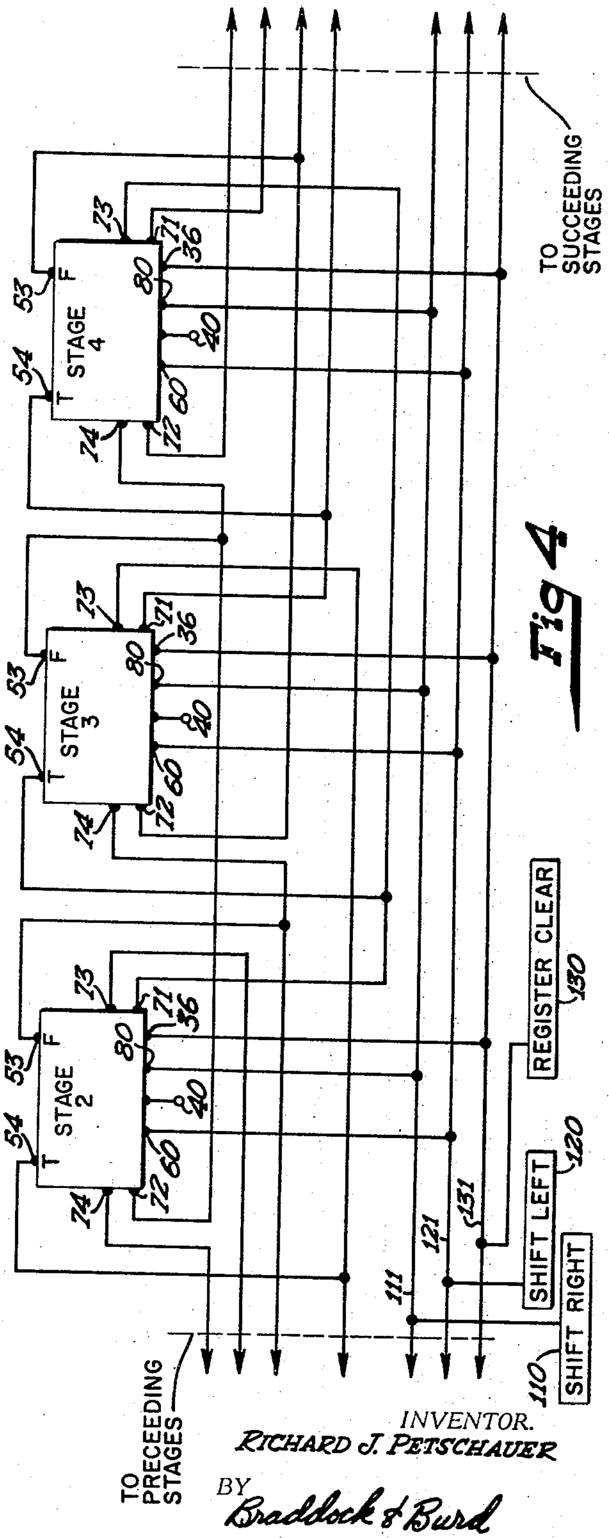
FIGURE 4 is a block diagram showing the interconnection between a plurality of stages of the shift register.

In FIGURE 4 there are shown three stages of a reversible synchronous serial shift register. Stages 2, 3 and 4 represent three stages out of a plurality of bistable circuits which make up the shift register. Each of stages 2, 3 and 4 is a bistable circuit such as shown in FIGURE 2. The input and output terminals shown in FIGURE 4 are labeled to correspond to the input and output terminals shown in FIGURE 2. In addition, FIGURE 4 discloses right shift signal apparatus 110, left shift signal apparatus 120 and register clear apparatus 130. The output of right shift apparatus 110 is connected to a right shift signal bus 111. The output of left shift apparatus 120 is connected to left shift signal bus 121. The output of register clear apparatus 130 is connected to register clear bus 131. Bus 111 is connected to right shift signal input terminal 80 on each stage of the shift register. Bus 121 is connected to left shift input terminal 60 on each stage of the shift register, and bus 131 is connected to clear input terminal 36 on each stage of the shift register.

To best understand the operation of this invention, the operation of the partial circuit of FIGURE 1 will first be described, to show the switching of a stage when it is toggled. Assume that transistor 16, the "false" transistor, is on and that it is desired to shift or trigger the bistable circuit so that transistor 11, the "true" transistor, is on. This will mean that a current is flowing from the common ground, from emitter 17 to collector 18 of transistor 16, and through resistor 23 to negative power input terminal 10. As a result the voltage level of collector 18, as well as false output terminal 53, will essentially be at ground, since transistor 16 is biased to be saturated and the votage drop from emitter 17 to collector 18 is negligible. Thus, the anode of diode 34, which is connected to collector 18, will be positive with respect to the cathode of diode 34, which is connected through resistor 32 to negative input terminal 10. The resulting current flow through diode 34 and resistor 32 will cause junction 28 to be more positive. This positive bias will be felt on base 14 to bias off transistor 11. This can be more clearly seen by reference to the wave-forms of FIGURE 3 where wave-form B shows output electrode or collector 13 at its most negative voltage level, wave-form C shows output electrode or collector 18 at its most positive voltage level, wave-form F shows control electrode or base 14 being slightly positive, and wave-form G shows control electrode or base 19 being slightly negative.

Since collector 18 is at ground or zero voltage, the anode of diode 47 will be biased at ground level through resistor 49. In the same way, the anode of diode 48 will be biased through resistor 52 to the most negative voltage which appears on collector 13 from negative power input terminal 10. These voltage levels may be seen by reference to wave-forms D and E, respectively. Assume now that a shift signal input, as represented by wave-form A, appears at toggle input terminal 40. Since the cathode of diode 41 is negatively biased through resistor 56 which is connected to negative input terminal 57, the positive going voltage on the anode of diode 41 will cause the signal to be seen at junction 42. This rising voltage signal will charge capacitor 44 and attempt to pass through diode 48. However, since the cathode of diode 48 is biased slightly positive, due to the bias on base 14 of transistor 11, and since the anode of diode 48 is heavily biased negative through resistor 52, as described above, diode 48 will be reversed biased and the positive going signal will not be able to pass through diode 48 to the control electrode or base 14 of transistor 11. The rising signal at junction 42 will also charge capacitor 43 to be felt at the anode of diode 47. Since the cathode of diode 47 is slightly negative, due to the saturation voltage on control electrode or base 19 of transistor 16, and the anode of diode 47 is biased to essentially zero volts through resistor 49, as described above, the rising signal will cause diode 47 to become forward biased to conduct a positive current into base 19 which will turn off transistor 16.

When transistor 16 turns off the immediate effect is to remove the zero voltage level from collector 18, which allows collector 18 to become strongly negative biased through resistor 23 connected to negative input terminal 10. This in turn strongly back biases diode 34 causing the current flow through resistor 32 to change, which will cause a voltage drop at junction 28 and a resulting lowering of the bias on base 14. When base 14 thus becomes slightly negative, transistor 11 will turn on and a current will flow from the common ground, from emitter 12 to collector 13, and through resistor 22 to negative output terminal 10. This in turn will raise the voltage level of collector 13, as well as true output terminal 54, to essentially ground level. As a result diode 37 will become forward biased causing a current to flow through resistor 35 to negative output terminal 10, thus raising the voltage level of junction 33, with a resulting positive bias on control or base electrode 19 that will keep transistor 16 off. This cycle of operation may be followed by reference to the first half of all the wave-forms of FIGURE 3. The rising waveform at junction 42 may be seen in the rising leading edge of wave-form A. The resulting charge of capacitor 44 will cause a positive going wave-form on the anode of diode 48, which is shown by wave-form E to be insufficient to forward bias diode 48. The resulting charge of capacitor 43 will cause a positive bias on the anode of diode 47, as may be seen in wave-form D. This positive spike will eventually trail off when the bistable circuit has triggered, but once turned off transistor 16 will be held off by the subsequent turn on of transistor 11. The change in bias on control electrode 14 may be seen in wave-form F at the point where the positive bias changes to the negative saturation level. The opposite effect takes place on control electrode 19 of transistor 16, where wave-form G indicates that the negative saturation level is swamped by the positive going pulse through diode 47 to turn off transistor 16, after which the bias of control electrode 19 returns to slightly above ground.

The occurrence of a second toggle signal at toggle input terminal 40 would result in the bistable circuit triggering back to its original position in substantally the same manner as above described. The second half of the wave forms of FIGURE 3 indicate the voltage levels during the second trigger cycle.

It should be noted that the RC time constant value of the combination of resistor 52 and capacitor 44, is chosen to be sufficiently long to prevent the rising voltage on collector 13 of transistor 11 from being felt on base 19 of transistor 16. This will prevent error in the state of the bistable circuit. The same is true of the combination of resistor 49 and capacitor 43, to prevent error during a trigger cycle back to the false state.

It should also be noted that the bistable circuit of FIGURE 1 can always be returned to the false state by putting a positive pulse into clear input terminal 36. If the bistable cricuit were already in the false state, that is with transistor 16 on, then the positive signal would appear at junction 29 to positively bias base 14 to keep transistor 11 off. If the bistable circuit were in the true state, that is with transistor 11 on, then the positive pulse at terminal 36 would cause transistor 11 to be biased off, which would turn on transistor 16 to again return the circuit to the false condition.

The operation of the bistable circuit of FIGURE 2 is essentially the same as that described for the toggle only bistable circuit of FIGURE 1. However, the additional OR gates in the FIGURE 2 bistable circuit enable the stage to receive information from either of its right or left adjacent stages. Further, the logic allows the direction from which the information will come to be determined by selection of a proper shift input signal If a signal is put into left shift signal input terminal 60, the information to the stage will come from its right adjacent member. If a signal is put into right shift signal input terminal 80, the information to the stage will come from its left adjacent member. Thus, as will become apparent, a plurality of bistable circuits such as that shown in FIGURE 2 may be interconnected into a serial reversible shift register.

For proper operation of the bistable circuit of FIGURE 2 left shift information terminal 71 must be connected to true output terminal 54 of the right hand adjacent stage, while left shift information terminal 52 must be connected to false output terminal 53 of the right hand adjacent stage. This may be seen by reference to FIGURE 4 in which terminals 71 and 72 of stage 3 are connected, respectively, to terminals 54 and 53 of stage 4. In the same manner, right shift information terminal 73 must be connected to true output terminal 54 of the left hand adjacent stage, while right shift information terminal 74 must be connected to false output terminal 53 of the left hand adjacent stage. This may also be seen by reference to FIGURE 4 in which terminals 73 and 74 of stage 3 are connected, respectively, to terminals 54 and 53 of stage 2.

Also with reference to FIGURE 4 it can be seen that right shift signal apparatus 110 is connected by right shift bus 111 to right shift signal input terminal 80 on each stage. Further, left shift signal apparatus 120 is connected by means of left shift bus 121 to left shift signal input terminal 60 on each stage.

Assume now that stages 2, 3 and 4, as shown in FIGURE 4, are in the true, false, and true states respectively. Assume also that it is desired to shift the information in the register to the left, such that stage 2 will contain the information now in stage 3, stage 3 will contain the information now in stage 4, and stage 4 will contain the information now stored in stage 5 (not shown). In that case, left shift signal apparatus 120 will be used to form a pulse such as that shown in wave-form A of FIGURE 3. The pulse will be carried by bus 121 to left shift signal input terminal 60 on each of the stages. Referring now to FIGURE 2, it can be seen that the rising leading edge of the pulse will pass through diode 61, which is forward biased by means of resistor 78 being connected to negative power input terminal 57. Therefore, the rising voltage wave-form will appear at junction 62. Assume that we are looking at stage 3, which was in the false state (transistor 16 on) and which is to be in the true state (transistor 11 on) at the end of the left shift.

The rising voltage wave form at junction 62 will charge capacitors 63 and 64 to cause a voltage rise at the anodes of diodes 67 and 68. The cathode of diode 68 will be biased slightly positive, since transistor 11 is off. The anode of diode 68 is connected through resistor 70 and terminal 72 to false output terminal 53 of stage 4. Since stage 4 is in the true state, the false output will be at its most negative point and diode 68 will be reverse biased to block the positive going signal from capacitor 64 from reaching base 14 of transistor 11. At the same time, the rising wave-form at junction 62 will cause capacitor 63 to charge to cause a rising voltage on the anode of diode 67. The cathode of diode 67 will be at the slightly negative saturation voltage of base 19 of on transistor 16. The anode of diode 67 is connected through resistor 69 and terminal 71 to true output terminal 54 of stage 4. Since stage 4 is in the true state, the voltage at terminal 54 will be at essentially ground or zero level, which will allow the positive pulse from the charge of capacitor 63 to pass through diode 67 to turn off transistor 16. The turn off of transistor 16 will result in the turn on of transistor 11, as described in the operation of FIGURE 1 above, and stage 3 will have been shifted to the true state as desired.

Since left shift bus 121 is connected to terminal 60 on each of these stages, the transfer and reception of information will have occurred synchronously or simultaneously along the entire shift register. Note that since there were no pulses to input terminals 40 and 80 on each stage, that there was no change in the voltage levels at the anodes of diodes 48 and 88, or diodes 47 and 87, to thus prevent any effect of right shift or toggle information. Further note that diodes 41, 61 and 81 are poled such that during a shift cycle any spurious positive noise signals are blocked from entering the buses, and thus error due to these spurious signals is prevented.

Since the state of stage 4 may be changing at the same time it is desired to transmit its previous state to stage 3, and since the desired transfer of information is dependent on the state of stage 4, there is a possibility of error in the system due to the simultaneous transfer and reception of information by each stage. To overcome any possibility of such error the bistable circuit of this invention uses long time constant values for, by way of example, capacitor 64 and resistor 70, capacitor 63 and resistor 69. By making the time constant of these resistor-capacitor combinations long, the changing state of a transmitting stage will not effect the transfer of information to the receiving stage. That is, the discharge time of the capacitors, such as 63 and 64, is long enough to prevent any signal other than the leading edge of the shift signal from passing through the OR gate to the control electrodes of transistors 11 and 16 (see wave-forms D and E).

If the reeciving stage is already in the state of the transmitting stage, then the receiving stage will not be affected by the shift cycle and will remain in the proper state. With reference to FIGURE 4, assume that stages 2 and 3 are both in the false state and that it is desired to shift right, such that the information in stage 2 will appear in stage 3. Now referring also to FIGURE 2, right shift information terminal 73 of stage 3 will be connected to true output terminal 54 of stage 2. Right shift information terminal 74 of stage 3 will be connected to false output terminal 53 of stage 2. Since stage 3 is in the false state, transistor 16 will be saturated, and control electrode 19 will be slightly negative, which negative bias will be felt on the cathode of diode 87. Since transistor 16 is on, transistor 11 will be off and control electrode or base 14 will be biased slightly positive, which bias will be felt on the cathode of diode 88. As stage 2 is also in the false state, the output from terminal 53 will be at ground or zero volts, which bias will be felt through terminal 74 and resistor 76 on the anode of diode 88. Also, true output terminal 54 of stage 2 will be at its most negative voltage, which bias will be felt through terminal 73 and resistor 75 on the anode of diode 87. Therefore, before a right shift pulse arrives, diode 87 is strongly reverse biased due to the large negative voltage on its anode, while diode 88 is only slightly reverse biased due to the small positive voltage on base 14 of transistor 11. When the leading edge of a shift signal, such as that of wave-form A, arrives at right shift signal input terminal 80, the rising voltage at capacitor 83 will not be able to pass through diode 87 due to the maximum negative bias on the anode of diode 87. The positive going voltage at capacitor 84 will forward bias diode 88 to pass through to the control electrode or base 14 of transistor 11. However, transistor 11 is already off and the positive going voltage on base 14 will merely tend to keep transistor 11 off, and it may thus be seen that there is no change in the state of stage 3. The long time constants of capacitor 83 and resistor 75, and capacitor 84 and resistor 76, will prevent any change in the state of stage 2 from further effecting the state of stage 3.

From the foregoing discussion of the structure and operation of this invention, it is apparent that what has been described is a new bistable circuit, a plurality of which may be connected into a unique reversible shift register. Although the bistable circuit of this invention has been described as one using a pair of transistors, it is not intended to limit the structure of this invention to devices using transistors, but it is intended and apparent that the novelty of this invention is extended to bistable circuits using other trigger means.

What is claimed is:

1. A shift register comprising:

a plurality of serially related bistable circuits, each of said bistable circuits being a stage of the shift register;

each of said bistable circuits having means for receiving impulses from a right adjacent stage and means receiving impulses from a left adjacent stage;

means including time delay means connected to said bistable circuits for simultaneous reception and transmission of information thereby;

left shift pulse means connected by a common output bus to said bistable circuits, and right shift pulse means connected by another common output bus to said bistable circuits, said left shift pulse means and said right shift pulse means adapted to serially shift information stored in the shift register left and right, respectively.

2. A synchronous serial shift register comprising:

a plurality of serially related bistable circuits, each of said bistable circuits being a stage of the shift register;

each of said bistable circuits including a cross-coupled pair of transistors having input, output and control electrodes, said pair of transistors including one transistor representing a false state of the stage and one transistor representing a true state of the stage;

each of said transistor's input and output electrodes adapted to be connected to a source of energy;

means connecting said output electrode of each of said false state transistors to said control electrodes of said true state transistors in each adjacent stage;

means connecting said output electrode of each of said true state transistors to said control electrodes of said false state transistors in each adjacent stage;

left shift pulse means having a common output line;

right shift pulse means having another common output line;

means including time delay means connecting said left shift pulse means common output line to each of said control electrodes, and means including time delay means connecting said right shift pulse means common output line to each of said control electrodes, so that information stored in the shift register may be selectively shifted to the left and to the right and may be simultaneously received and transmitted by each of said bistable circuits.

3. The synchronous serial shift register of claim 2 in which all of said time delay means connected to said control electrodes provide a time constant longer than the state switching time of said bistable circuits so that the reception of the information by one stage from a preceding stage does not effect the simultaneous transfer of information from said one stage to a succeeding stage.

4. The synchronous serial shift register of claim 2 in which:

said means connecting said output electrode of each of said false state transistors to said control electrodes of said true state transistors in each adjacent stage includes a resistor intermediate said output electrode and said control electrodes;

said means connecting said output electrode of each of said true state transistors to said control electrodes of said false state transistors in each adjacent stage includes another resistor intermediate said output electrode and said control electrodes;

said means connecting said left shift pulse means common output line to each of said control electrodes includes a capacitor intermediate said common output line and each of said control electrodes;

said means connecting said right shift pulse means common output line to each of said control electrodes includes another capacitor intermediate said common output line and each of said control electrodes; and each of said resistors is serially connected with one of said capacitors to provide a time constant longer than the state switching time of said bistable circuits, to prevent error due to simultaneous reception and transfer of information from said stages.

5. Reversible shift register apparatus comprising;

a plurality of transistors having input, output and control electrodes;

each of said transistor's input and output electrodes adapted to be connected to a source of energy;

successive pairs of said transistors being connected in circuit to form bistable stages of a shift register each of said stages having a true transistor and a false transistor;

first and second resistors in each of said stages having one end connected to the output electrode of said true transistor, the other end of said first resistor being connected by a first diode to the control electrode of said false transistor in the succeeding stage, and the other end of said second resistor being connected by a second diode to the control electrode of said false transistor in the preceding stage, for shifting information left or right from said true transistor in each of said stages;

third and fourth resistors in each of said stages having one end connected to the output electrode of said false transistor, the other end of said third resistor being connected by a third diode to the control electrode of said true transistor in the succeeding stage, and the other end of said fourth resistor being connected by a fourth diode to the control electrode of said true transistor in the preceding stage, for shifting information left or right from said false transistor in each of said stages;

a source of left shift signal and a source of right shift signal having, respectively, a left shift output bus and a right shift output bus;

first and second capacitors in each of said stages, said first capacitor having one plate connected by said first diode to the control electrode of said false transistor, said second capacitor having one plate connected by said third diode to the control electrode of said true transistor, the other plates of said first and second capacitors being connected by a fifth diode to said right shift output bus, for transmitting a right shift signal to each of said stages; and third and fourth capacitors in each of said stages, said third capacitor having one plate connected by said second diode to the control electrode of said false transistor, said fourth capacitor having one plate connected by said fourth diode to the control electrode of said true transistor, the other plates of said third and fourth capacitors being connected by a sixth diode to said left shift output bus, for transmitting a left shift signal to each of said stages.

6. The reversible shift register apparatus of claim 5 in which the time constants of said first resistor and said first capacitor, said second resistor and said third capacitor, said third resistor and said second capacitor, and said fourth resistor and said fourth capacitor are each longer than the state switching time of each of said stages, to prevent error due to simultaneous reception and transfer of information by each of said stages.

7. The reversible shift register apparatus of claim 5 including:

a first toggle diode connecting said toggle input terminal a pair of toggle capacitors;

a first toggle diode connecting said toggle input terminal to one plate on each of said of capacitors;

a second toggle diode connecting the other plate on one of said pair of capacitors to the control electrode of said false transistor; and a third toggle diode connecting the other plate on the other of said pair of capacitors to the control electrode of said true transistor, for changing the state of said stages upon appearance of a toggle signal at said toggle input terminal.

8. A bistable multivibrator for a reversible shift register comprising:

a first transistor having first input, output and control electrodes;

said first input and output electrodes adapted to be connected to a source of energy;

a second transistor having second input, output and control electrodes;

said second input and output electrodes adapted to be connected to a source of energy;

means connecting said transistors in circuit across a pair of power input terminals adapted to be connected to a source of energy;

means cross-coupling said first output electrode to said second control electrode, and said second output electrode to said first control electrode so that the turn off of one of said transistors will turn on the other;

a left shift pulse input terminal and a right shift pulse input terminal;

means including a serially connected first capacitor and first diode connecting said left shift pulse input terminal to said first control electrode;

means including a serially connected second capacitor and second diode connecting said left shift pulse input terminal to said second control electrode;

means including a serially connected third capacitor and third diode connecting said right shift pulse input terminal to said first control electrode;

means including a serially connected fourth capacitor and fourth diode connecting said right shift pulse input terminal to said second control electrode;

first and second left shift information terminals;

first and second right shift information terminals;

means connecting said first left shift information terminal to said first control electrode through said first diode;

means connecting said second left shift information terminal to said second control electrode through said second diode;

means connecting first right shift information terminal to said first control electrode through said third diode; and means connecting said second right shift information terminal to said second control electrode through said fourth diode.

9. The bistable multivibrator of claim 8 including:

a toggle pulse terminal;

means including a serially connected first toggle capacitor and first toggle diode connecting said toggle pulse terminal to said first control electrode;

means including a serially connected second toggle capacitor and second toggle diode connecting said toggle pulse terminal to said second control electrode;

means connecting said first output electrode to said first control electrode through said first toggle diode; and means connecting said second output electrode to said second control electrode through said second toggle diode.

10. Flip-flop apparatus for a reversible shift register comprising:

a pair of cross-coupled transistors connected in circuit to form a bistable circuit and each having a control electrode;

first and second diodes having one electrode connected to a control electrode on a first of said pair of transistors;

third and fourth diodes having one electrode connected to a control electrode on a second of said pair of transistors;

a left shift signal input terminal;

a right shift signal input terminal;

a fifth diode having one electrode connected to said left shift signal input terminal;

a sixth diode having one electrode connected to said right shift signal input terminal;

a first capacitor connected between another electrode on said first diode and another electrode on said fifth diode;

a second capacitor connected between another electrode on said second diode and another terminal on said sixth diode;

a third capacitor connected between another electrode on said third diode and said another electrode on said fifth diode;

a fourth capacitor connected between another electrode on said fourth diode and said another electrode on said sixth diode;

first and second left shift information terminals;

first and second right shift information terminals;

a first resistor connected between said first left shift information terminal and said another electrode on said first diode;

a second resistor connected between said first right shift information terminal and said another electrode on said second diode;

a third resistor connected between said second left shift information terminal and said another electrode on said third diode;

a fourth resistor connected between said second right shift terminal and said another electrode on said fourth diode.

11. The flip-flop of claim 10 in which the time constants of the combinations of each of said first resistor and first capacitor, said second resistor and second capacitor, said third resistor and third capacitor, and said fourth resistor and fourth capacitor, are significantly longer than the change of state time of the flip-flop, to prevent error due to simultaneous reception and transmission of information by the flip-flop.

12. Bistable multivibrator apparatus for a reversible shift register comprising:

a pair of cross-coupled transistors connected in circuit to form a bistable circuit and each having a control electrode and an output electrode;

a first "OR" gate having its output connected to a control electrode on a first of said pair of transistors;

a second "OR" gate having its output connected to a control electrode on a second of said pair of transistors;

a left shift signal input terminal;

a right shift signal input terminal;

first capacitance means connecting said left shift input terminal to a first input on each of said first and second "OR" gates;

second capacitance means connecting said right shift input terminal to a second input on each of said first and second "OR" gates;

first and second left shift information terminals;

first and second right shift information terminals;

first resistance means connecting said first left shift information terminal to said first input on said first "OR" gate;

second resistance means connecting said second left shift information terminal to said first input on said second "OR" gate;

third resistance means connecting said first right shift information terminal to said second input on said first "OR" gate; and fourth resistance means connecting said second right shift information terminal to said second input on said first "OR" gate.

13. The bistable multivibrator apparatus of Claim 12 in which said resistance means combine with the respective of said capacitance means to form a time constant significantly longer than the switching time of the multivibrator to prevent errors from simultaneous reception and transfer of information by the multivibrator.

14. The bistable multivibrator apparatus of Claim 12 including toggle apparatus comprising:

a toggle signal input terminal;

third capacitance means connecting said toggle signal input terminal to a third input on each of said first and second "OR" gates;

fifth resistance means connected between an output electrode on said first of said pair of transistors and said third input on said first "OR" gate; and sixth resistance means connected between an output electrode on said second of said pair of transistors and said third input on said second "OR" gate.

15. The bistable multivibrator apparatus of Claim 12 including:

a third "OR" gate having an input connected to said left shift signal input terminal and an output connected to said first capacitance means; and a fourth "OR" gate having an input connected to said right shift signal input terminal and an output connected to said second capacitance means.

16. The bistable multivibrator apparatus of Claim 14 including:

a fifth "OR" gate having an input connected to said toggle signal input terminal and an output connected to said third capacitance means.

17. The bistable multivibrator apparatus of Claim 14 in which said fifth and sixth resistance means combine, selectively with said third capacitance means to form a time constant significantly longer than the toggle time of the multivibrator to prevent error due to spurious signals during the toggling cycle.

References Cited

UNITED STATES PATENTS

| | | | |
|---|---|---|---|
| 2,922,985 | 1/1960 | Crawford | 307—88.5 |
| 2,988,701 | 6/1961 | Clapper | 328—37 |
| 3,067,341 | 12/1962 | Kunzke | 307—88.5 |

ARTHUR GAUSS, *Primary Examiner.*

S. D. MILLER, *Assistant Examiner.*